United States Patent
Tanaka et al.

(10) Patent No.: US 9,162,307 B2
(45) Date of Patent: Oct. 20, 2015

(54) ALTERNATING-CURRENT WELDING METHOD AND ALTERNATING-CURRENT WELDING DEVICE

(75) Inventors: Yoshiaki Tanaka, Osaka (JP);
Masafumi Naruto, Osaka (JP);
Yoshiyuki Tabata, Hyogo (JP);
Norikazu Oosaki, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 389 days.

(21) Appl. No.: 13/387,136

(22) PCT Filed: Feb. 15, 2011

(86) PCT No.: PCT/JP2011/000818
§ 371 (c)(1),
(2), (4) Date: Jan. 26, 2012

(87) PCT Pub. No.: WO2011/105022
PCT Pub. Date: Sep. 1, 2011

(65) Prior Publication Data
US 2012/0118866 A1 May 17, 2012

(30) Foreign Application Priority Data
Feb. 23, 2010 (JP) .................. 2010-036797

(51) Int. Cl.
*B23K 9/10* (2006.01)
*B23K 9/067* (2006.01)
*B23K 9/073* (2006.01)
*B23K 9/095* (2006.01)
*B23K 9/23* (2006.01)

(56) References Cited

(52) U.S. Cl.
CPC ............. *B23K 9/0673* (2013.01); *B23K 9/0738* (2013.01); *B23K 9/0956* (2013.01); *B23K 9/23* (2013.01); *B23K 2203/10* (2013.01)

(58) Field of Classification Search
CPC ........ B23K 9/10; B23K 9/093; B23K 9/0672; B23K 9/073
USPC ............. 219/130.31, 130.33, 130.21, 121.57, 219/124.1, 130.5, 130.51, 130.4
See application file for complete search history.

(56) References Cited

U.S. PATENT DOCUMENTS 3,598,954 A * 8/1971 Iceland et al. ................ 219/111
4,092,517 A * 5/1978 Woodacre ............... 219/137 PS
(Continued)

FOREIGN PATENT DOCUMENTS

CN   101264543 A   9/2008
CN   2009167856    2/2009
(Continued)

OTHER PUBLICATIONS

International Application Serial No. PCT/JP2011/000818, International Search Report mailed May 24, 2011, 2 pgs.
(Continued)

*Primary Examiner* — Tu B Hoang
*Assistant Examiner* — Alba Rosario-Aponte
(74) *Attorney, Agent, or Firm* — RatnerPrestia

(57) ABSTRACT

If arc interruption occurs during AC arc welding, a first AC frequency predetermined for normal welding is switched to a second AC frequency higher than the first AC frequency. This allows the arc to be reignited without applying a high frequency high voltage, thereby preventing the damage of the surface of the weld bead or communication failure due to the high frequency high voltage.

15 Claims, 10 Drawing Sheets

U.S. PATENT DOCUMENTS

| | | | |
|---|---|---|---|
| 4,348,578 A | | 9/1982 | Masaki |
| 4,904,843 A | * | 2/1990 | Hori et al. ............... 219/137 PS |
| 4,963,715 A | * | 10/1990 | Tuttle ...................... 219/130.4 |
| 5,220,151 A | * | 6/1993 | Terayama et al. ........ 219/130.32 |
| 5,264,679 A | * | 11/1993 | Martin ..................... 219/130.4 |
| 5,365,035 A | * | 11/1994 | Poulsen et al. ........... 219/137 PS |
| 2008/0223840 A1 | * | 9/2008 | Era et al. ................. 219/130.21 |

FOREIGN PATENT DOCUMENTS

| | | |
|---|---|---|
| CN | 101486126 A | 7/2009 |
| JP | 54-121254 | 9/1979 |
| JP | 56-111576 | 9/1981 |
| JP | S6232027 B2 | 7/1987 |
| JP | 63005877 A | 1/1988 |
| JP | 09206938 A | 8/1997 |

OTHER PUBLICATIONS

China Search Report for Application No. 201180002639.8, dated Jan. 6, 2014.

The Extended European Search Report dated Jan. 12, 2015 for the related European Patent Application No. 11746995.7.

* cited by examiner

ALTERNATING-CURRENT WELDING METHOD AND ALTERNATING-CURRENT WELDING DEVICE

TECHNICAL FIELD

The present invention relates to a method and device for performing AC (Alternating-Current) arc welding in which a negative-polarity period and a positive-polarity period are alternated

BACKGROUND ART

In terms of environmental issues, aluminum and magnesium materials have been used in recent years for buildings, vehicles, etc. because of their lightweight and highly recyclable natures. These materials are generally joined by AC arc welding. However, in the case of applying AC arc welding to, for example, an aluminum material, arc interruption may occur when the polarity is switched from positive (the electrode is negative) to negative (the electrode is positive) or vice versa.

Arc interruption reduces workability, and also cools the melt pool, possibly causing weld defects. The conventional way to solve these problems is to regenerate the arc by applying a high-frequency high voltage between the electrode and the base material.

The operation of a conventional AC arc welding device to address arc interruption will be described as follows with reference to FIGS. 9 and 10. FIG. 9 is a schematic configuration view of the conventional AC arc welding device. FIG. 10 shows the change in welding control signals with time when arc interruption occurs during conventional AC arc welding control.

The operation of the AC arc welding device having the structure shown in FIG. 9 will be described with reference to FIG. 10. This is a non-consumable electrode AC arc welding device in which a positive-polarity period and a negative-polarity period are alternated.

In FIG. 9, AC arc welding device 1 includes welding output unit 2, AC frequency controller 3, current detection unit 4, arc interruption detecting unit 6, and high-voltage generator 16. Welding output unit 2 outputs a welding output. AC frequency controller 3 controls an AC frequency. Current detection unit 4 detects a welding current. Arc interruption detecting unit 6 detects arc interruption from the detection result of current detection unit 4. High-voltage generator 16 applies a high voltage between electrode 9 and base material 12. Electrode 9 is provided in welding torch 10. The welding output from welding output unit 2 is applied between electrode 9 and base material 12 so as to create arc 11 used for welding.

In FIG. 10, a time E1 is when the arc is extinguished, and a time E2 is when the arc is reignited.

In FIG. 9, welding output unit 2 includes primary and secondary inverters for alternating the positive-polarity period and the negative-polarity period based on the output of AC frequency controller 3. Welding output unit 2 receives commercial power (for example, three-phase 200V) from outside of AC arc welding device 1 and outputs welding voltage and current suitable for welding.

A negative polarity means that arc plasma electrons move in the direction from base material 12 to electrode 9, and that electrode 9 is positive, and base material 12 is negative. A positive polarity, on the other hand, means that arc plasma electrons move in the direction from electrode 9 to base material 12, and that electrode 9 is negative, and base material 12 is positive.

Current detection unit 4, which can be composed of a current transformer (CT), detects the welding current, and sets an arc interruption signal high when arc interruption occurs, and low when the arc is present.

Arc interruption detecting unit 6, which can be composed of a CPU, determines the occurrence of arc interruption from a current detection signal received from current detection unit 4.

AC frequency controller 3, which can be composed of a CPU, controls the welding output at a predetermined AC frequency, and outputs positive and negative control signals determined based on the AC frequency to welding output unit 2.

Welding output unit 2 includes IGBTs or other similar devices which switch the output polarity based on the positive and negative control signals. When the positive control signal is high, welding output unit 2 changes the output polarity such that electrons move from electrode 9 to base material 12, thereby providing the positive-polarity period. When the negative control signal is high, on the other hand, welding output unit 2 changes the output polarity such that electrons move from base material 12 to electrode 9, thereby providing the negative-polarity period.

The welding current and voltage from welding output unit 2 are supplied to welding torch 10 to create arc 11 between the tip of electrode 9 and base material 12 so as to perform AC arc welding.

High-voltage generator 16 applies a high frequency high voltage (generally, 12 kV) between electrode 9 and base material 12 when the arc interruption signal received from arc interruption detecting unit 6 is high. When the arc interruption signal is low, high-voltage generator 16 stops applying the high frequency high voltage.

As shown in FIG. 10, the arc interruption signal goes high at the time E1 when the arc is extinguished during normal welding. High-voltage generator 16 applies a high frequency high voltage (for example, 12 kV) to regenerate the arc between electrode 9 and base material 12.

Applying the high frequency high voltage between electrode 9 and base material 12 breaks the isolation between them, thereby regenerating the arc. At the time E2 when the arc is regenerated, high-voltage generator 16 stops applying the high frequency high voltage.

AC frequency controller 3 operates at an AC frequency predetermined for normal welding both while the arc is being interrupted and when the arc is present.

As described hereinbefore, according to the conventional method for performing AC arc welding using AC arc welding device 1, the arc is regenerated by applying a high frequency high voltage at the occurrence of arc interruption (see, for example, Patent Literature 1).

In this conventional method, however, the high frequency high voltage applied to reignite the arc at the occurrence of arc interruption may damage the surface of the weld bead or cause communication failure due to the high frequency high voltage.

CITATION LIST

Patent Literature

PTL 1: Japanese Patent Examined Publication No. 62-32027

SUMMARY OF THE INVENTION

The present invention provides a method and device for performing AC arc welding in which the arc is reignited without applying a high frequency high voltage at the occurrence of arc interruption.

The method for performing AC arc welding of the present invention alternates a negative-polarity period and a positive-polarity period at a first AC frequency. This method includes a detection step for detecting arc interruption during welding, and a control step for, upon detection of the arc interruption in the detection step, reigniting the arc by outputting a high level of a positive control signal or a negative control signal for a period shorter than a first period corresponding to the first AC frequency.

This method allows the arc to be reignited without applying a high frequency high voltage at the occurrence of arc interruption. With this method, AC arc welding can be performed without damaging the surface of the weld bead or causing communication failure due to the high frequency high voltage.

The AC arc welding device of the present invention in which a negative-polarity period and a positive-polarity period are alternated includes a first AC-frequency setting unit, an output detection unit, an arc interruption detecting unit, and an AC frequency controller. The first AC-frequency setting unit sets a first AC frequency predetermined for normal welding. The output detection unit detects a welding current or a welding voltage. The arc interruption detecting unit detects arc interruption based on the detection result of the output detection unit. The AC frequency controller controls the AC frequency based on the detection result of the arc interruption detecting unit. Upon detection of arc interruption, the arc is reignited by outputting a high level of a positive or negative control signal for a shorter period than a first period corresponding to the first AC frequency.

With this structure, the arc can be reignited without applying a high frequency high voltage at the occurrence of arc interruption. As a result, AC arc welding is performed without damaging the surface of the weld bead or causing communication failure due to the high frequency high voltage.

DESCRIPTION OF EMBODIMENTS

Figure 1:
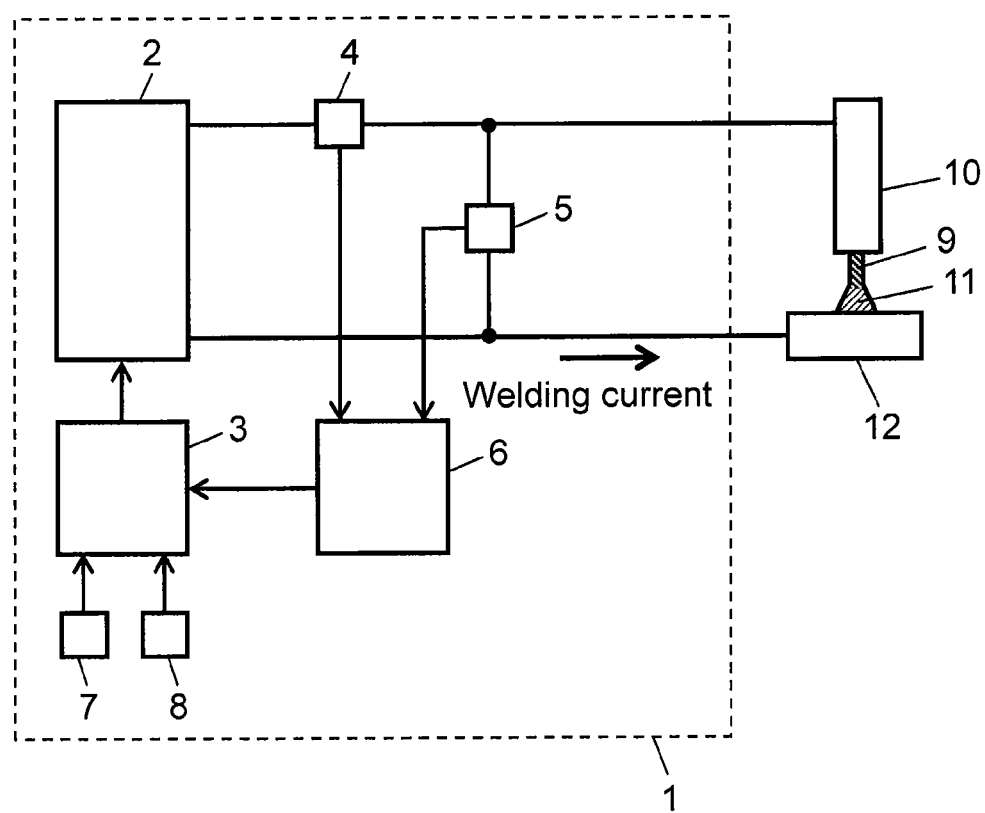
FIG. 1 is a schematic configuration view of an AC arc welding device according to a first exemplary embodiment of the present invention.

Embodiments of the present invention will be described as follows with reference to the accompanied drawings. In these drawings, the same reference numerals are used for the same components, and hence the description thereof may be omitted.

First Exemplary Embodiment

Figure 2:
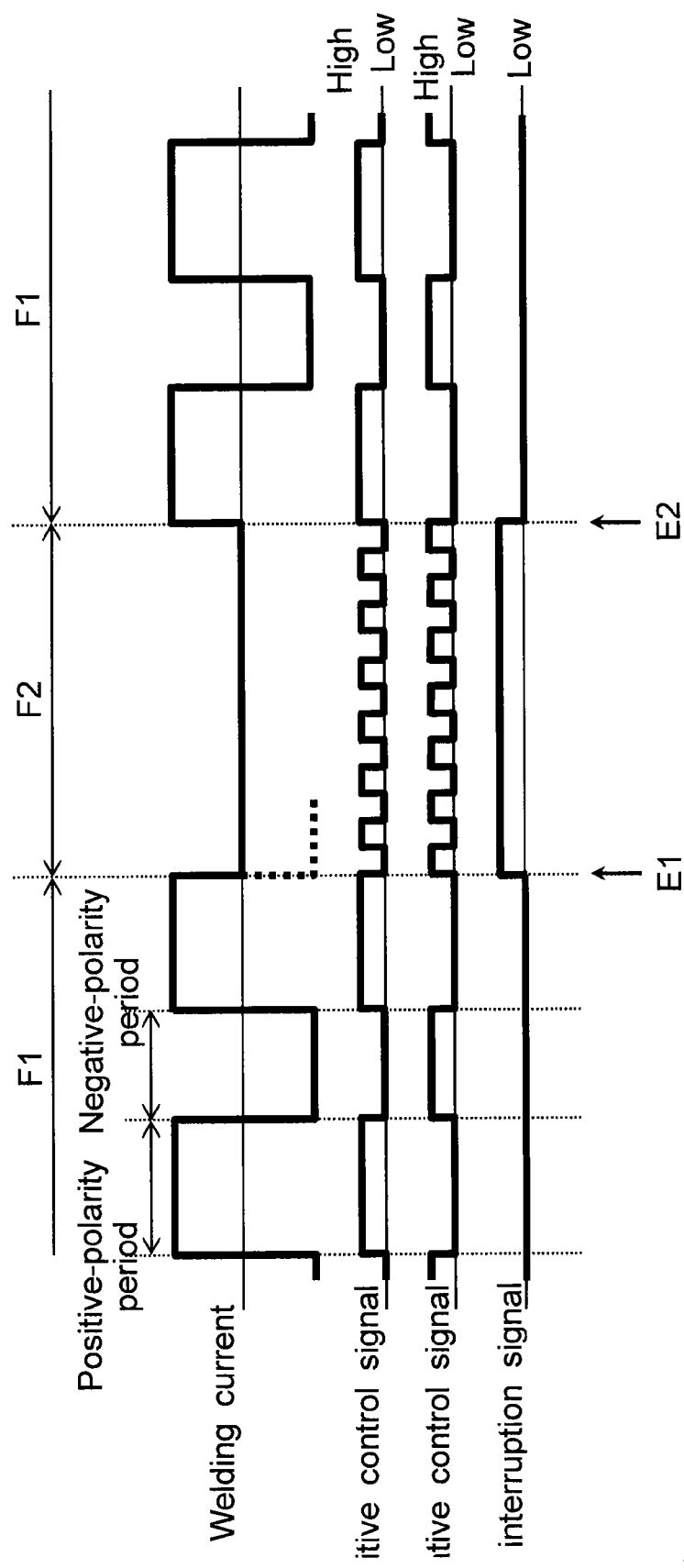
FIG. 2 shows the change in the AC frequencies of control signals with time in AC arc welding according to the first exemplary embodiment of the present invention.

FIG. 1 is a schematic configuration view of an AC arc welding device according to a first exemplary embodiment of the present invention. FIG. 2 shows the change in the AC frequencies of control signals with time in AC arc welding according to the first exemplary embodiment. More specifically, FIG. 2 shows the change in the amplitude of each of a welding current, a positive control signal, a negative control signal, and an arc interruption signal with time.

The operation of the AC arc welding device having the structure shown in FIG. 1 will be described with reference to FIG. 2. This is a non-consumable electrode AC arc welding device in which negative-polarity period and a positive-polarity period are alternated.

In FIG. 1, AC arc welding device 1 includes welding output unit 2, AC frequency controller 3, current detection unit 4, voltage detection unit 5, arc interruption detecting unit 6, first AC-frequency setting unit 7, and second AC-frequency setting unit 8. Welding output unit 2 outputs a welding output. AC frequency controller 3 controls an AC frequency. Current detection unit 4 detects a welding current. Voltage detection unit 5 detects a welding voltage. Arc interruption detecting unit 6 detects arc interruption from the output of either current detection unit 4 or voltage detection unit 5. First AC-frequency setting unit 7 sets a first AC frequency. Second AC-frequency setting unit 8 sets a second AC frequency. The welding output from welding output unit 2 is applied between electrode 9 provided in welding torch 10 and base material 12 so as to create arc 11.

In FIG. 2, F1 in period P1 represents a first AC frequency of the positive and negative control signals, and F2 represents a second AC frequency of the positive and negative control signals. A time E1 is when the arc is extinguished, and a time E2 is when the arc is reignited.

In FIG. 1, welding output unit 2 includes unillustrated primary and secondary inverters for alternating the positive-polarity period and the negative-polarity period based on the output of AC frequency controller 3. Welding output unit 2 receives commercial power (for example, three-phase 200V) from outside of AC arc welding device 1, and outputs welding voltage and current suitable for welding.

The primary inverter is generally driven by a pulse width modulation (PWM) operation or a phase shift operation. The primary inverter is composed of unillustrated insulated gate bipolar transistors (IGBTs), a primary rectifier diode, a smoothing electrolytic capacitor, a transformer for power conversion, and other components.

The secondary inverter is generally composed of unillustrated insulated gate bipolar transistors (IGBTs), and switches the polarity of the welding voltage or current.

A negative polarity means that arc plasma electrons move in the direction from base material 12 to electrode 9, and that electrode 9 is positive, and base material 12 is negative. A positive polarity, on the other hand, means that arc plasma electrons move in the direction from electrode 9 to base material 12, and that electrode 9 is negative, and base material 12 is positive.

Current detection unit 4, which can be composed of a current transformer (CT), detects the welding current. Voltage detection unit 5 detects the welding voltage.

Arc interruption detecting unit 6, which can be composed of a CPU, receives a current detection signal from current detection unit 4. If the current detection signal reaches a predetermined current detection level (for example, 1 A) or below indicating that the arc is being interrupted, unit 6 determines the occurrence of arc interruption, and sets the arc interruption signal high (arc interruption determination level). If the current detection signal reaches a predetermined current detection level (for example, 3 A) or above indicating that the arc is present, unit 6 sets the arc interruption signal low (arc determination level).

Arc interruption detecting unit 6 receives a voltage detection signal from voltage detection unit 5. If the voltage detection signal reaches arc interruption voltage (for example, 60V) or above indicating that the arc is being interrupted, unit 6 may determine the occurrence of arc interruption. Arc interruption detecting unit 6 then may set the arc interruption signal high (arc interruption determination level). If the voltage detection signal reaches another predetermined voltage detection level (for example, 50V) or below, unit 6 may set the arc interruption signal low (arc determination level), indicating that the arc is present.

First AC-frequency setting unit 7, which can be composed of a CPU, sets a first AC frequency F1 as an AC arc frequency predetermined for normal welding. Second AC-frequency setting unit 8, which can be composed of a CPU, sets a second AC frequency F2 higher than the first AC frequency. The first and second AC frequencies F1 and F2 can be, for example, 70 Hz and 400 Hz, respectively.

AC frequency controller 3, which can be composed of a CPU, controls the welding output based on the arc interruption signal from arc interruption detecting unit 6, and the output of each of first and second AC-frequency setting units 7 and 8. AC frequency controller 3 outputs positive and negative control signals determined based on the AC frequencies to welding output unit 2.

The ratio of the positive-polarity period to the negative-polarity period is predetermined (for example, the proportion of the negative-polarity period in the AC cycle is 30%). This ratio is generally called a "cleaning width".

Welding output unit 2 makes the IGBTs switch the output polarity based on the positive and negative control signals from AC frequency controller 3. When the positive control signal is high, the output polarity is switched to make the positive-polarity period and to move electrons from electrode 9 to base material 12. When the negative control signal is high, on the other hand, the output polarity is switched to make the negative-polarity period and to move electrons from base material 12 to electrode 9.

The welding current and voltage from welding output unit 2 are supplied to welding torch 10 to create arc 11 between tip 9a of electrode 9 and base material 12 so as to perform AC arc welding. Electrode 9 can be made of tungsten, and base material 12 can be made, for example, of aluminum or magnesium as an object to be welded.

In AC arc welding, arc interruption tends to occur when the polarity is switched, especially from the positive-polarity period to the negative-polarity period. When arc interruption is detected, as shown in FIG. 2, a high level of the negative control signal, and then a high level of the positive control signal are outputted for a shorter period than the first period corresponding to the first AC frequency F1. The alternate output of the high level of the positive and negative control signals reignites the arc. After the arc is reignited, the AC frequency of the positive and negative control signals is returned to the original first AC frequency F1, thereby continuing AC arc welding.

As described hereinbefore, AC arc welding device 1 of the present invention performs welding in which the negative-polarity period and the positive-polarity period are alternated. AC arc welding device 1 includes first AC-frequency setting unit 7, an output detection unit including current detection unit 4 and/or voltage detection unit 5, arc interruption detecting unit 6, and AC frequency controller 3. First AC-frequency setting unit 7 sets the first AC frequency F1 predetermined for normal welding. The output detection unit detects a welding current or voltage. Arc interruption detecting unit 6 detects arc interruption based on the detection result of the output detection unit. AC frequency controller 3 controls the AC frequency based on the detection result of arc interruption detecting unit 6. Upon detection of arc interruption, the arc is reignited by outputting a high level of the positive or negative control signal for a period shorter than the first period corresponding to the first AC frequency F1.

With this structure, the arc can be reignited without applying a high frequency high voltage at the occurrence of arc interruption. As a result, AC arc welding is performed without damaging the surface of the weld bead or causing communication failure due to the high frequency high voltage.

The following is a detailed description, with reference to FIG. 2, of the operation of AC arc welding device 1 to reignite the arc at the occurrence of arc interruption.

As shown in FIG. 2, AC welding is performed at the first AC frequency F1 (for example, 70 Hz) during normal welding. If the arc is extinguished at the time E1 when the positive-polarity period is switched to the negative-polarity period, the arc interruption signal goes high at the time E1. In this case, AC frequency controller 3 outputs to welding output unit 2 an instruction to switch from the first AC frequency F1 (for example, 70 Hz), which is predetermined for normal welding, to the second AC frequency F2 (for example, 400 Hz). As a result, the welding is performed at the second AC frequency F2.

Thus, while arc interruption is going on, the AC frequency is at the second AC frequency F2. The positive and negative control signals go high and low alternately at the second AC frequency F2. If the arc is reignited at the time E2, the arc interruption signal goes low at the time E2. In this case, AC frequency controller 3 instructs welding output unit 2 to switch from the second AC frequency F2 to the first AC frequency F1 predetermined for normal welding. As a result, welding is continued at the first AC frequency F1.

AC arc welding device 1 further includes second AC-frequency setting unit 8 for setting the second AC frequency F2 higher than the first AC frequency F1. When arc interruption detecting unit 6 detects arc interruption, AC frequency controller 3 switches from the first AC frequency F1 to the second AC frequency F2. With this structure, the arc can be reignited without applying a high frequency high voltage at the occurrence of arc interruption.

As described above, if arc interruption is detected during welding, the first AC frequency (for example, 70 Hz) predetermined for normal welding is switched to the second AC frequency (for example, 400 Hz). This makes the arc much more likely to be reignited to continue welding.

The reason for this is as follows. Immediately after arc interruption occurs, the space between electrode 9 and base material 12 is in the arc atmosphere. Therefore, the arc can be easily regenerated by repeating switching the polarity at intervals shorter than in normal welding.

The arc interruption is terminated in a short time (several hundreds of microseconds), preventing the arc from being extinguished completely. It becomes unnecessary to apply a high frequency high voltage (for example, 12 kV) from the high-voltage generator to regenerate the arc as in the conventional example. The arc can be regenerated at a voltage as low as used in normal welding. This eliminates the problems of communication failure, the adverse effect on surrounding electronic devices, and the damage of the surface of the weld bead because no high voltage is applied to base material 12.

AC arc welding described in the present first exemplary embodiment uses a non-consumable electrode, but may alternatively use a consumable electrode to provide a similar effect.

The method of the present invention for performing AC arc welding in which a negative-polarity period and a positive-polarity period are alternated at the first AC frequency F1 includes a detection step and a control step. The detection step detects arc interruption during welding. The control step, upon detection of the arc interruption in the detection step, reignites the arc by outputting a high level of a positive or negative control signal for a period shorter than a first period corresponding to the first AC frequency F1.

This method allows the arc to be reignited without applying a high frequency high voltage at the occurrence of arc interruption. With this method, AC arc welding can be performed without damaging the surface of the weld bead or causing communication failure due to the high frequency high voltage.

In the control step, welding may be performed at the second AC frequency F2 higher than the first AC frequency F1.

With this method, the arc can be reignited with a simple circuit and a simple system design without applying a high frequency high voltage at the occurrence of arc interruption.

Upon detection of the arc while welding is performed at the second AC frequency F2, the AC frequency may be returned to the first AC frequency F1.

With this method, arc welding can be smoothly continued under the original welding conditions even if arc interruption occurs.

Second Exemplary Embodiment

Figure 3:
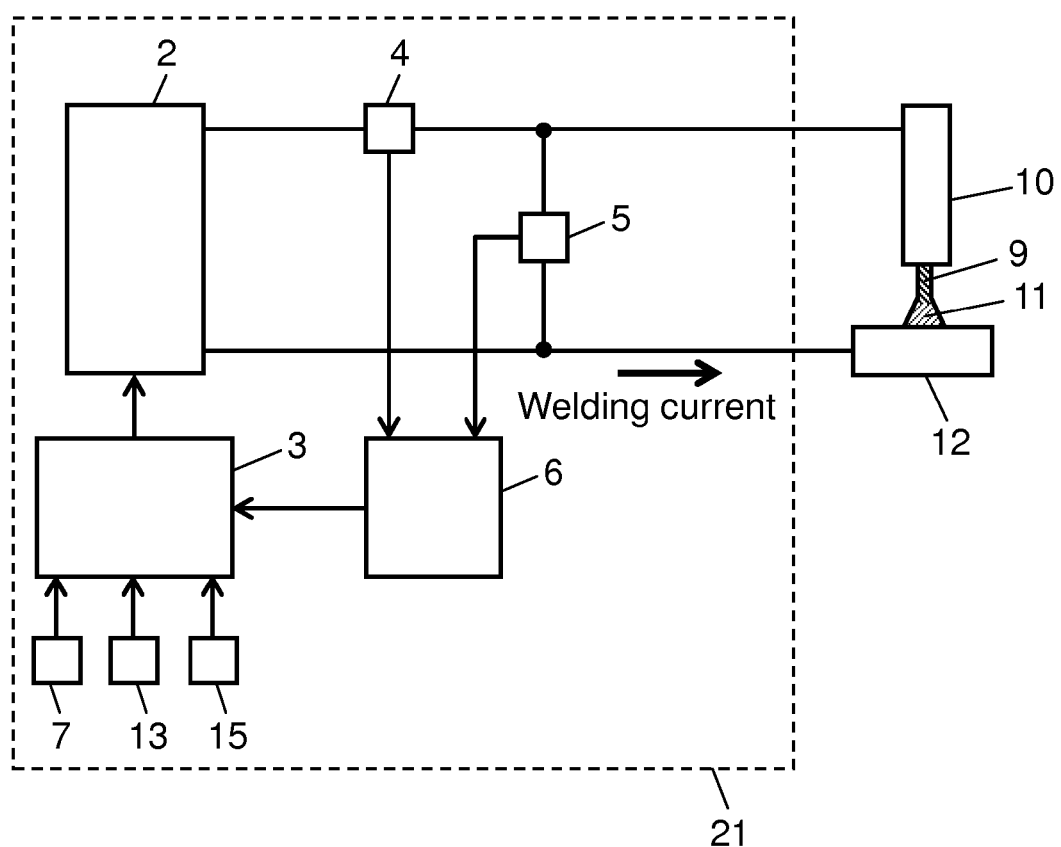
FIG. 3 is a schematic configuration view of an AC arc welding device according to a second exemplary embodiment of the present invention.
Figure 4:
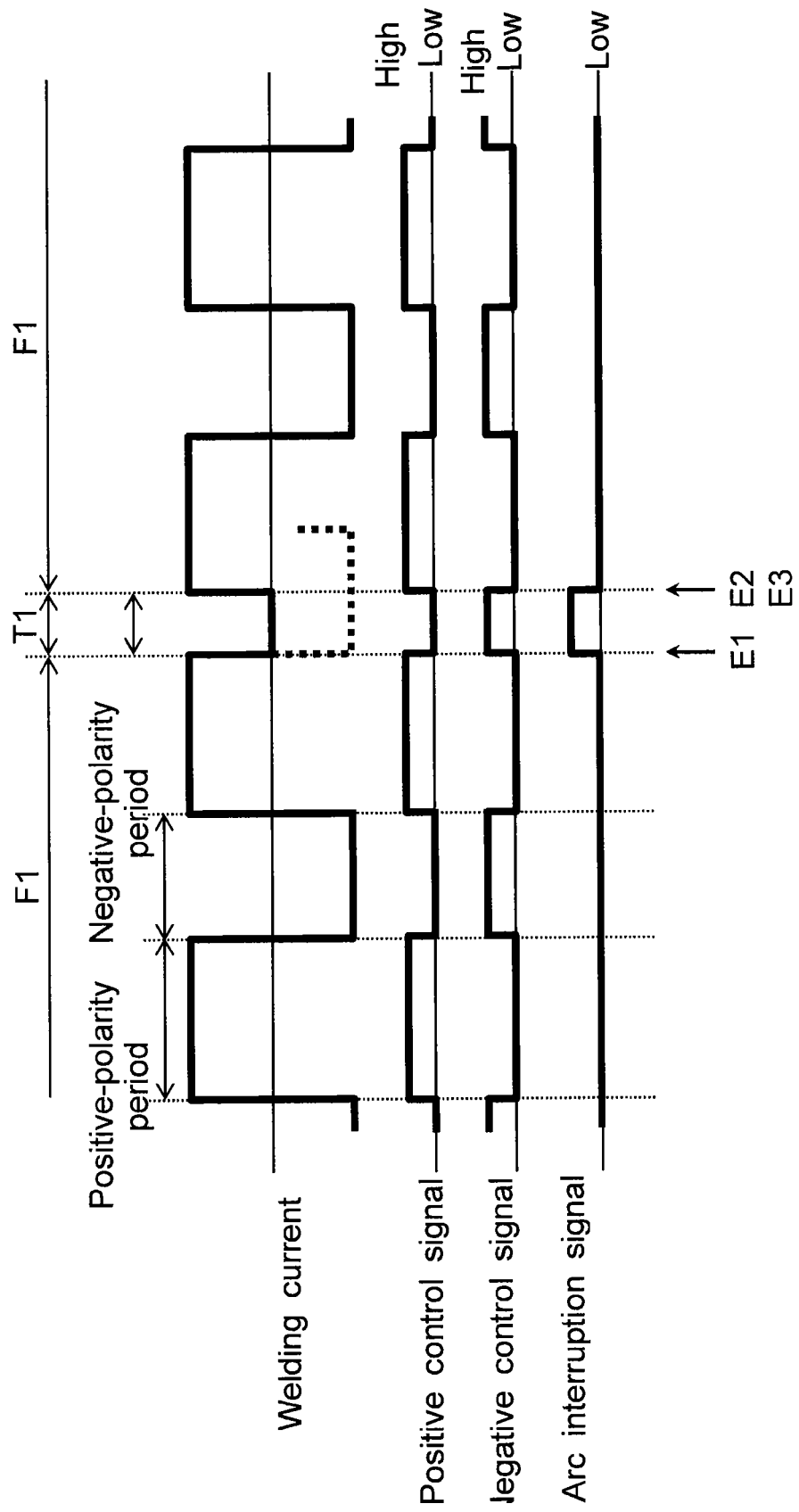
FIG. 4 shows the change in a positive-polarity period and a negative-polarity period of control signals with time in AC arc welding according to the second exemplary embodiment of the present invention.

FIG. 3 is a schematic configuration view of AC arc welding device 21 according to a second exemplary embodiment of the present invention. FIG. 4 shows the change in a positive-polarity period and a negative-polarity period of control signals with time in AC arc welding according to the second exemplary embodiment. AC arc welding device 21 using a non-consumable electrode will be described as follows with reference to FIGS. 3 and 4.

The present second exemplary embodiment mainly differs from the first exemplary embodiment in counting the time of arc interruption and outputting a control signal to switch the polarity if the arc interruption continues for a predetermined time.

In FIG. 3, AC arc welding device 21 includes first predetermined-period setting unit 13 and time keeper 15 for counting time, in addition to most of the components included in the first exemplary embodiment. In FIG. 4, a time E3 is when a first predetermined period T1 has passed since the occurrence of arc interruption at the time E1.

In FIG. 3, first predetermined-period setting unit 13, which can be composed of a CPU, sets a first predetermined period (for example, 100 microseconds) shorter than the negative-polarity period in normal welding. Time keeper 15, which can be composed of a CPU, counts the time since arc interruption occurred in the negative-polarity period during which the negative control signal is being outputted. AC frequency controller 3, which can be composed of a CPU, transmits a control signal to welding output unit 2 based on the arc interruption signal from arc interruption detecting unit 6, and the output of each of first AC-frequency setting unit 7, first predetermined-period setting unit 13, and time keeper 15. This controls the welding output.

In FIG. 4, if the arc is extinguished at the time E1 when the positive-polarity period is switched to the negative-polarity period during welding at the first AC frequency F1, the arc interruption signal goes high at the time E1. When the arc interruption signal goes high, time keeper 15 starts to count the time of arc interruption in the negative-polarity period. At the time E3 when the time counted by time keeper 15 has passed the first predetermined period T1 shorter than the negative-polarity period in normal welding, AC frequency controller 3 outputs a positive control signal to welding output unit 2. As a result, the negative-polarity period is switched to the positive-polarity period.

In the case where the first AC frequency is 70 Hz, and the proportion of the negative-polarity period in the AC cycle is 30%, the negative-polarity period can be, for example, 4.28 milliseconds. The first predetermined period T1 can be, for example, 100 microseconds.

In FIG. 4, the arc is reignited at the time E3 when the negative-polarity period is switched to the positive-polarity period. When the arc is reignited, welding is continued at the first AC frequency F1 predetermined for normal welding.

As described above, AC arc welding device 21 further includes first predetermined-period setting unit 13 for setting a first predetermined period shorter than the negative-polarity period, and time keeper 15 for counting the period of arc interruption. In AC arc welding device 21, if arc interruption continues for the first predetermined period in the negative-polarity period during which AC frequency controller 3 is outputting the negative control signal, controller 3 outputs a positive control signal to switch to the positive-polarity period.

This structure allows the arc to be reignited without applying a high frequency high voltage at the occurrence of arc interruption.

According to the method of the present invention for performing AC arc welding, in the negative-polarity period during which the negative control signal is being outputted, if arc interruption continues for the first predetermined period shorter than the negative-polarity period, the high level of the positive control signal is outputted in the control step so as to switch to the positive-polarity period.

This method allows the arc to be reignited without applying a high frequency high voltage at the occurrence of arc interruption.

As described hereinbefore, if arc interruption occurs in the negative-polarity period and continues for the first predetermined period T1 (for example, 100 microseconds), the arc becomes more likely to be reignited by switching to the positive-polarity period. The reason for this is considered as follows. The shorter the first predetermined period T1, the space between electrode 9 and base material 12 remains in the arc atmosphere, allowing the arc to be easily regenerated. Experimental results indicate that the first predetermined period T1 is preferably within 1 millisecond.

According to the present second exemplary embodiment, arc interruption is terminated in a short time (for example, several hundreds of microseconds), preventing the arc from being extinguished completely. It becomes unnecessary to apply a high frequency high voltage (for example, 12 kV) to regenerate the arc. This eliminates the problems of communication failure, the adverse effect on surrounding electronic devices, and the damage of the surface of the weld bead.

AC arc welding described in the present second exemplary embodiment uses a non-consumable electrode, but may alternatively use a consumable electrode to provide a similar effect.

Third Exemplary Embodiment

Figure 5:
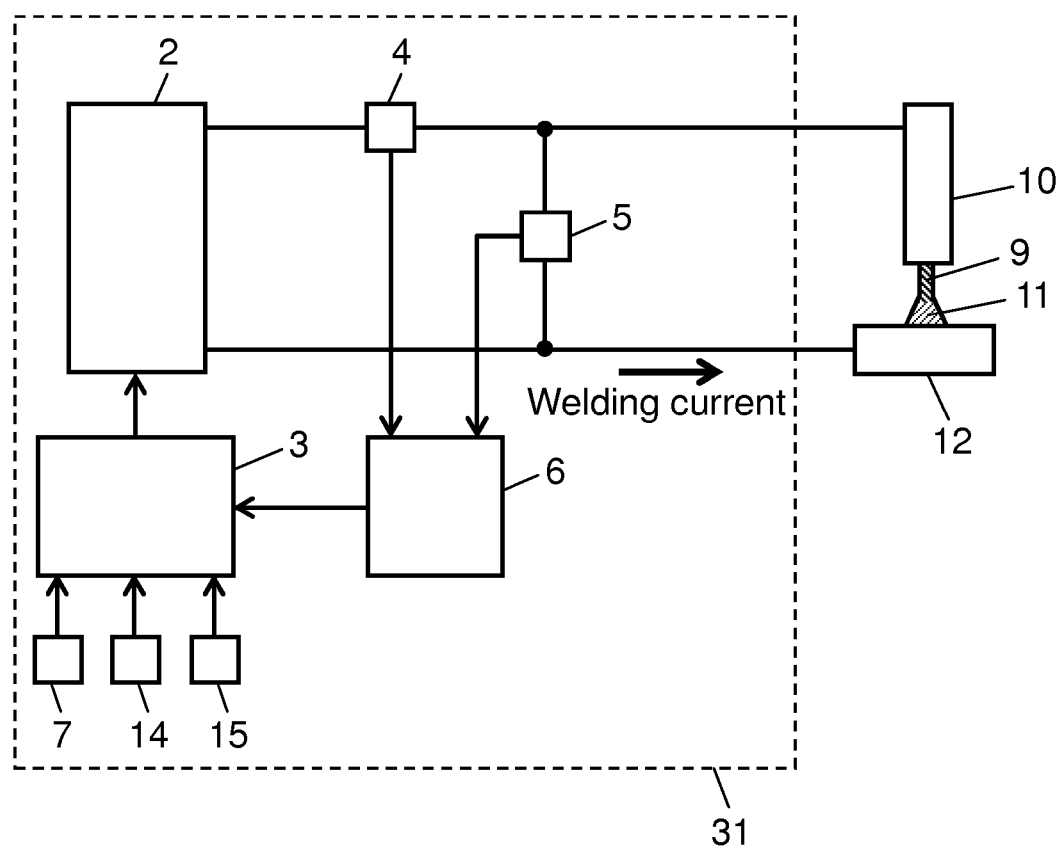
FIG. 5 is a schematic configuration view of an AC arc welding device according to a third exemplary embodiment of the present invention.
Figure 6:
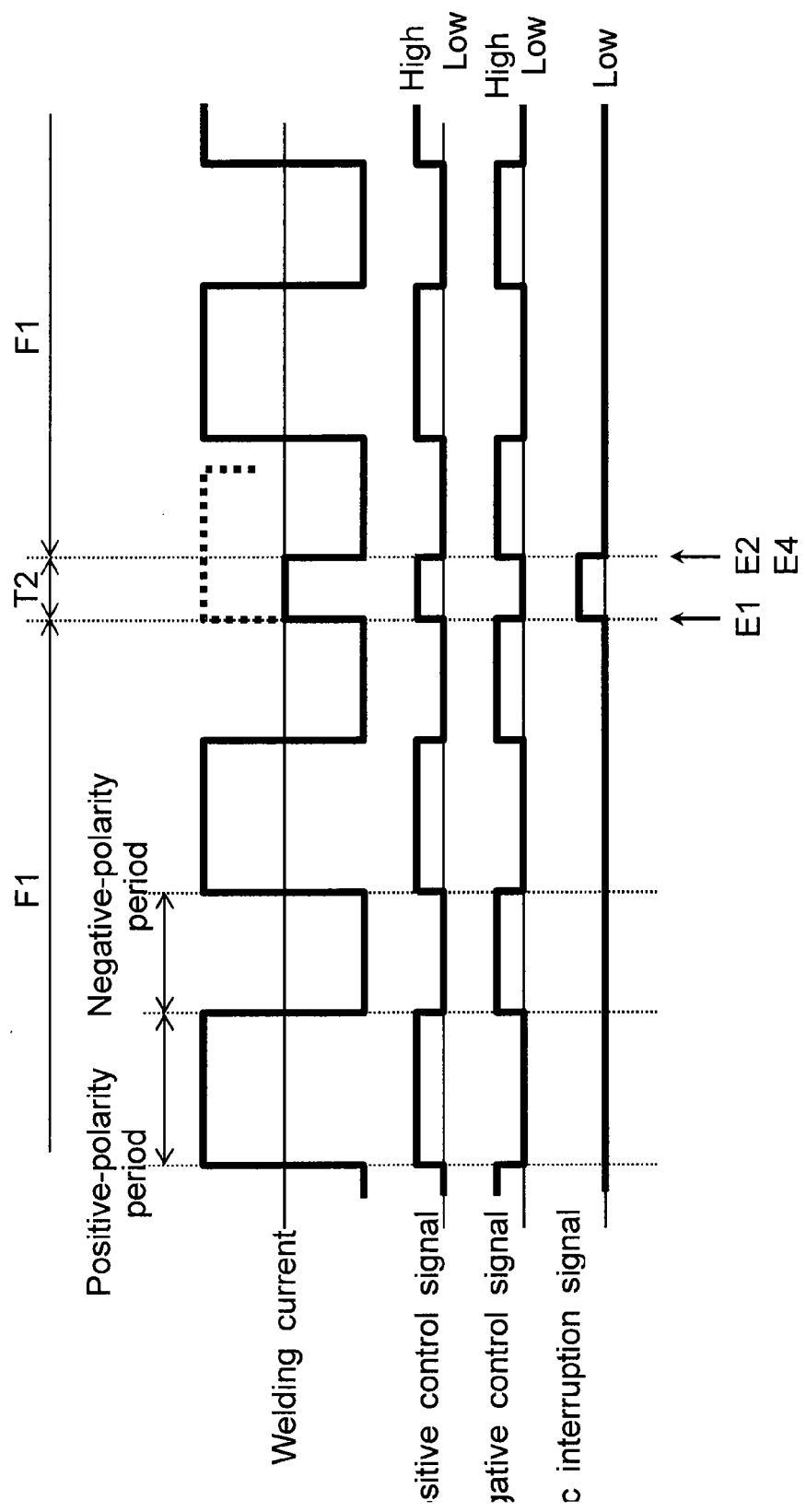
FIG. 6 shows the change in a positive-polarity period and a negative-polarity period of control signals with time in AC arc welding according to the third exemplary embodiment of the present invention.

FIG. 5 is a schematic configuration view of AC arc welding device 31 according to a third exemplary embodiment of the present invention. FIG. 6 shows the change in a positive-polarity period and a negative-polarity period of control signals with time in AC arc welding according to the third exemplary embodiment. The AC arc welding device of the present third exemplary embodiment using a non-consumable electrode will be described as follows with reference to FIGS. 5 and 6.

The present third exemplary embodiment mainly differs from the second exemplary embodiment in counting the time of arc interruption occurred in the positive-polarity period during which the positive control signal is being outputted, and outputting a control signal to switch the polarity if the arc interruption continues for a predetermined time.

In FIG. 5, AC arc welding device 31 includes second predetermined-period setting unit 14 in addition to most of the components included in the second exemplary embodiment. In FIG. 6, a time E4 is when a second predetermined period T2 has passed since the occurrence of arc interruption at the time E1.

In FIG. 5, second predetermined-period setting unit 14, which can be composed of a CPU, sets a second predetermined period T2 (for example, 100 microseconds) shorter than the positive-polarity period in normal welding. Time keeper 15, which can be composed of a CPU, counts the time of arc interruption occurred in the positive-polarity period during which the positive control signal is being outputted. AC frequency controller 3, which can be composed of a CPU, transmits a control signal to welding output unit 2 based on the arc interruption signal from arc interruption detecting unit 6, and the output of each of first AC-frequency setting unit 7, second predetermined-period setting unit 14, and time keeper 15. This controls the welding output.

In FIG. 6, if the arc is extinguished at the time E1 when the negative-polarity period is switched to the positive-polarity period during normal welding at first AC frequency F1, the arc interruption signal goes high at the time E1. When the arc interruption signal goes high, time keeper 15 starts to count the time of arc interruption in the positive-polarity period. At the time E4, AC frequency controller 3 outputs a negative control signal to welding output unit 2. As a result, the positive-polarity period is switched to the negative-polarity period. The time E4 is when the time counted by time keeper 15 has passed the second predetermined period T2 shorter than the positive-polarity period in normal welding.

In the case where the first AC frequency F1 is 70 Hz, and the proportion of the negative-polarity period in the AC cycle is 30%, the positive-polarity period can be, for example, 10 milliseconds. The second predetermined period T2 can be, for example, 100 microseconds.

In FIG. 6, the arc is reignited at the time E4 when the positive-polarity period is switched to the negative-polarity period. When the arc is reignited, welding is continued at the first AC frequency F1 predetermined for normal welding.

As described above, AC arc welding device 31 further includes second predetermined-period setting unit 14 for setting a second predetermined period shorter than the positive-polarity period, and time keeper 15 for counting the period of arc interruption. In AC arc welding device 31, if arc interruption continues for the second predetermined period in the positive-polarity period during which AC frequency controller 3 is outputting the positive control signal, controller 3 outputs the negative control signal to switch to the negative-polarity period.

This structure allows the arc to be reignited without applying a high frequency high voltage at the occurrence of arc interruption.

According to the method of the present invention for performing AC arc welding, in the positive-polarity period during which the positive control signal is being outputted, if arc interruption continues for the second predetermined periods shorter than the positive-polarity period, the high level of the negative control signal is outputted in the control step so as to switch to the negative-polarity period.

This method allows the arc to be reignited without applying a high frequency high voltage at the occurrence of arc interruption.

As described hereinbefore, if arc interruption occurs in the positive-polarity period and continues for the second predetermined period T2 (for example, 100 microseconds), the arc becomes more likely to be reignited by switching to the negative-polarity period. The reason for this is considered as follows. The shorter the second predetermined period T2, the space between electrode 9 and base material 12 remains in the arc atmosphere, allowing the arc to be easily regenerated. Experimental results indicate that the second predetermined period T2 is preferably within 1 millisecond.

According to the present third exemplary embodiment, arc interruption is terminated in a short time (for example, several hundreds of microseconds), preventing the arc from being extinguished completely. It becomes unnecessary to apply a high frequency high voltage (for example, 12 kV) to regenerate the arc. This eliminates the problems of communication failure, the adverse effect on surrounding electronic devices, and the damage of the surface of the weld bead.

AC arc welding described in the present third exemplary embodiment uses a non-consumable electrode, but may alternatively use a consumable electrode to provide a similar effect.

Fourth Exemplary Embodiment

Figure 7:
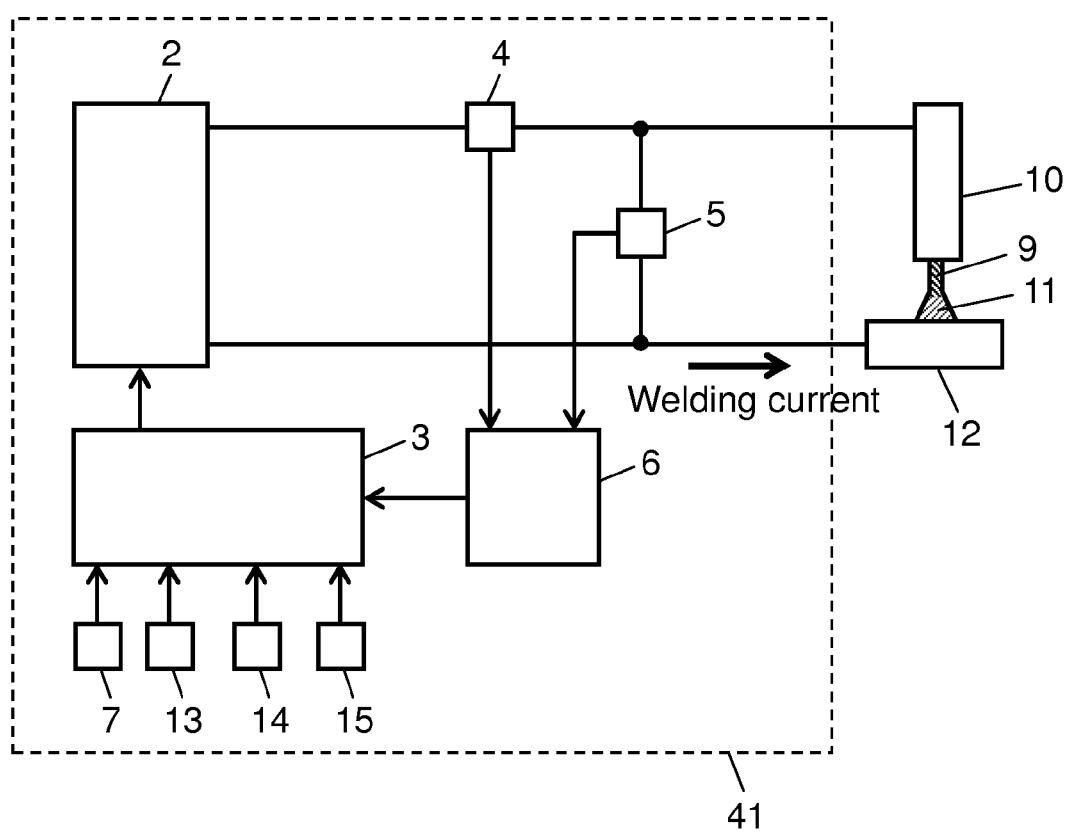
FIG. 7 is a schematic configuration view of an AC arc welding device according to a fourth exemplary embodiment of the present invention.
Figure 8:
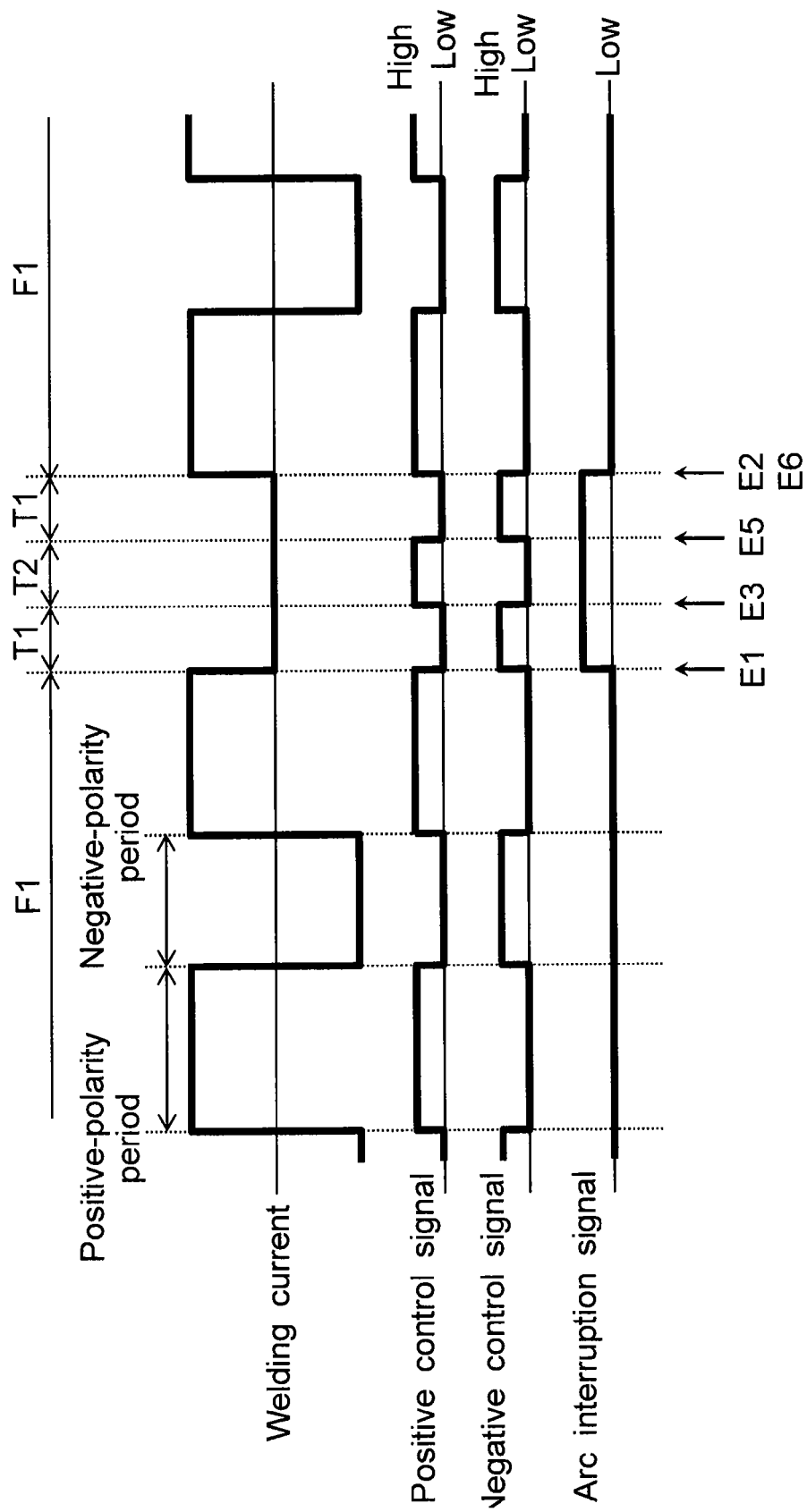
FIG. 8 shows the change in a positive-polarity period and a negative-polarity period of control signals with time in AC arc welding according to the fourth exemplary embodiment of the present invention.
Figure 9:
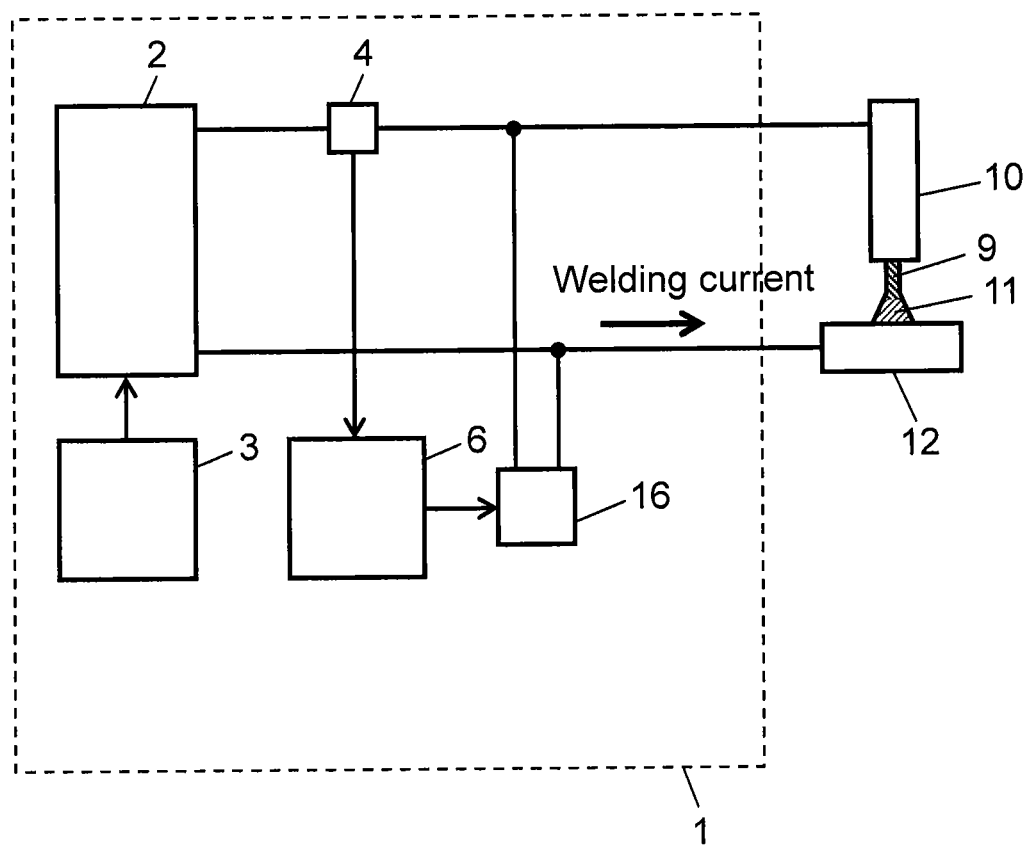
FIG. 9 is a schematic configuration view of a conventional AC arc welding device.
Figure 10:
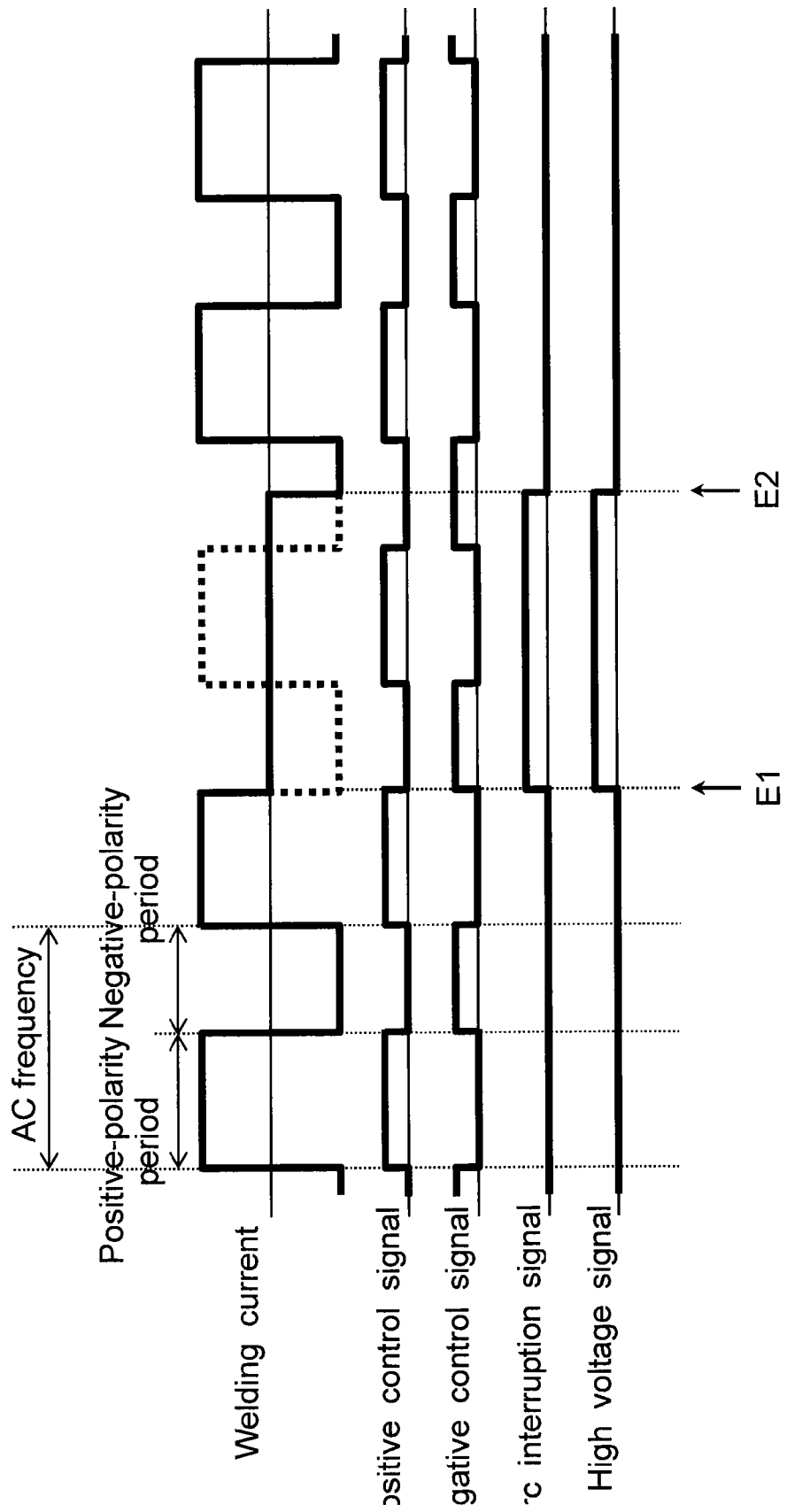
FIG. 10 shows the change in welding control with time when arc interruption occurs during conventional AC arc welding control.

FIG. 7 is a schematic configuration view of AC arc welding device 41 according to a fourth exemplary embodiment of the present invention. FIG. 8 shows the change in a positive-polarity period and a negative-polarity period of control signals with time in AC arc welding according to the fourth exemplary embodiment. The AC arc welding device of the present fourth exemplary embodiment using a non-consumable electrode will be described as follows with reference to FIGS. 7 and 8.

The present fourth exemplary embodiment mainly differs from the first to third exemplary embodiments in counting the time of arc interruption occurred in the negative-polarity period during which the negative control signal is being outputted, and outputting a control signal to switch the polarity if the arc interruption continues for a predetermined time. If the arc interruption continues for another predetermined time, a control signal is outputted to switch the polarity again.

In FIG. 8, a time E5 is when the second predetermined period T2 has passed since the time E3, and a time E6 is when the first predetermined period T1 has passed since the time E5.

In FIG. 7, AC frequency controller 3, which can be composed of a CPU, controls the welding output based on the arc interruption signal from arc interruption detecting unit 6, and the output of each of first AC-frequency setting unit 7, first predetermined-period setting unit 13, second predetermined-period setting unit 14, and time keeper 15.

In FIG. 8, the arc is extinguished and the arc interruption signal goes high at the time E1 when the positive-polarity period during normal welding at the first AC frequency (for example, 70 Hz) is switched to the negative-polarity period.

Time keeper 15 counts the time of arc interruption in the negative-polarity period. AC frequency controller 3 outputs a positive control signal to terminate the negative-polarity period at the time E3. The time E3 is when the time counted by time keeper 15 has passed the first predetermined period T1 (for example, 100 microseconds).

In FIG. 8, the arc is not reignited at the time E3 in spite that the polarity is switched. In this case, the arc interruption is going on, and time keeper 15 counts the time of arc interruption since the time E3 during which the positive control signal is being outputted. At the time E5 when the time counted by time keeper 15 has passed the second predetermined period T2 (fox example, 100 microseconds), AC frequency controller 3 outputs the negative control signal to terminate the positive-polarity period.

In FIG. 8, the arc is not reignited at the time E5 in spite that the polarity control signal is changed again. In this case, the arc interruption is going on, and time keeper 15 counts the time of arc interruption since the time E5 during which the negative control signal is being outputted. At the time E6 when the time counted by time keeper 15 has passed the first predetermined period T1 (for example, 100 microseconds), AC frequency controller 3 outputs the positive control signal to terminate the negative-polarity period.

In FIG. 8, the arc is reignited at the time E6 when the polarity is switched from negative to positive. When the arc is reignited, welding is continued at the first AC frequency F1 predetermined for normal welding.

As described hereinbefore, if arc interruption occurs, the arc becomes more likely to be reignited by repeating switching between the two polarity control signals at short intervals.

According to the present fourth exemplary embodiment, arc interruption is terminated in a short time (for example, several hundreds of microseconds), preventing the arc from being extinguished completely. It becomes unnecessary to apply a high frequency high voltage (for example, 12 kV) to regenerate the arc. This eliminates the problems of communication failure, the adverse effect on surrounding electronic devices, and the damage of the surface of the weld bead.

AC arc welding described in the present fourth exemplary embodiment uses a non-consumable electrode, but may alternatively use a consumable electrode to provide a similar effect.

INDUSTRIAL APPLICABILITY

As described hereinbefore, according to the present invention, arc interruption, when it occurs, can be terminated in a short time to regenerate the arc without applying a high frequency high voltage. This eliminates the problems of communication failure and the damage of the surface of the weld bead due to the application of a high frequency high voltage, thereby obtaining excellent welding results. The method and device of the present invention for performing AC arc welding are particularly applicable to industries using aluminum and magnesium materials, such as automotive and construction industries.

REFERENCE MARKS IN THE DRAWINGS 1, 21, 31, 41 AC arc welding device
2 welding output unit
3 AC frequency controller
4 current detection unit
5 voltage detection unit
6 arc interruption detecting unit
7 first AC-frequency setting unit
8 second AC-frequency setting unit
9 electrode
10 welding torch
11 arc
12 base material
13 first predetermined-period setting unit
14 second predetermined-period setting unit
15 time keeper
16 high-voltage generator

The invention claimed is:

1. A method for performing AC arc welding in which a negative-polarity period and a positive-polarity period for performing welding are alternated between a first period and a second period corresponding to a first AC frequency based on a positive control signal and a negative control signal, the method comprising:
   alternating the positive control signal between a high level for the first period and a low level for the second period, the high level of the positive control signal producing the positive-polarity period;
   alternating the negative control signal between the low level for the first period and the high level for the second period, the high level of the negative control signal producing the negative-polarity period,
   wherein the positive control signal and the negative control signal are separate from each other and are complementary to each other, and
   wherein the high level is greater than the low level;
   a detection step for detecting an arc interruption during welding; and
   a control step for, upon detection of the arc interruption in the detection step, reigniting an arc by outputting the high level of the positive control signal and the high level of the negative control signal for a period shorter than the first period and the second period corresponding to the first AC frequency, wherein in the control step, welding is performed at a second AC frequency higher than the first AC frequency, and wherein upon detection of the arc while welding is performed at the second AC frequency, the AC frequency is returned to the first AC frequency.

2. The method of claim 1, wherein
   in the negative-polarity period during which the negative control signal is being outputted, if arc interruption continues for a first predetermined period shorter than the negative-polarity period, the high level of the positive control signal is outputted in the control step so as to switch to the positive-polarity period, otherwise the negative control signal continues to be output during the negative-polarity period.

3. The method of claim 1, wherein
   in the positive-polarity period during which the positive control signal is being outputted, if arc interruption continues for a second predetermined period shorter than the positive-polarity period, the high level of the negative control signal is outputted in the control step so as to switch to the negative-polarity period, otherwise the positive control signal continues to be output during the positive-polarity period.

4. An AC arc welding device in which a negative-polarity period and a positive-polarity period for performing welding are alternated between a first period and a second period corresponding to a first AC frequency based on a positive control signal and a negative control signal, the device comprising:
- a first AC-frequency setting unit for setting the first AC frequency;
- an output detection unit for detecting a welding current or a welding voltage;
- an arc interruption detecting unit for detecting an arc interruption based on a detection result of the output detection unit;
- an AC frequency controller for:
  - controlling the first AC frequency based on normal welding by:
    - alternating the positive control signal between a high level for the first period and a low level for the second period, the high level of the positive control signal producing the positive-polarity period, and
    - alternating the negative control signal between the low level for the first period and the high level for the second period, the high level of the negative control signal producing the negative-polarity period,
    - wherein the positive control signal and the negative control signal are separate from each other and are complementary to each other,
    - wherein the high level is greater than the low level, and
  - controlling the first AC frequency based on a detection result of the arc interruption detecting unit, by:
    - upon detection of the arc interruption, reigniting the arc by outputting the high level of the positive control signal and the high level of the negative control signal for a period shorter than the first period and the second period corresponding to the first AC frequency; and a second AC-frequency setting unit for setting a second AC frequency higher than the first AC frequency, wherein upon detection of the arc interruption by the arc interruption detecting unit, the AC frequency controller switches the first AC frequency to the second AC frequency, and wherein upon detection of the arc while welding is performed at the second AC frequency, the AC frequency is returned to the first AC frequency.

5. The AC arc welding device of claim 4, further comprising:
- a first predetermined-period setting unit for setting a first predetermined period shorter than the negative-polarity period; and
- a time keeper for counting a period of the arc interruption, wherein
if the arc interruption continues for the first predetermined period in the negative-polarity period during which the AC frequency controller is outputting the negative control signal, the AC frequency controller outputs the positive control signal to switch to the positive-polarity period, otherwise the negative control signal continues to be output during the negative-polarity period.

6. The AC arc welding device of claim 4, further comprising:
- a second predetermined-period setting unit for setting a second predetermined period shorter than the positive-polarity period; and
- a time keeper for counting a period of the arc interruption, wherein
if the arc interruption continues for the second predetermined period in the positive-polarity period during which the AC frequency controller is outputting the positive control signal, the AC frequency controller outputs the negative control signal to switch to the negative-polarity period, otherwise the positive control signal continues to be output during the positive-polarity period.

7. A method for performing AC arc welding comprising:
welding with an arc generated by alternating a first negative-polarity period and a first positive-polarity period at a first AC frequency based on a positive control signal and a negative control signal;
detecting an arc interruption; and
generating an arc by alternating a second negative-polarity period and a second positive-polarity period, at a second AC frequency higher than the first AC frequency, wherein
the second negative-polarity period is shorter than the first negative-polarity period,
the second positive-polarity period is shorter than the first positive-polarity period
wherein the positive control signal and the negative control signal are separate from each other and are complementary to each other, and wherein upon detection of the arc while welding is performed at the second AC frequency, the AC frequency is returned to the first AC frequency.

8. The method of claim 7, wherein
in the first negative-polarity period and the second negative-polarity period, the positive control signal is a high level, and
in the first positive-polarity period and the second positive-polarity period, the negative control signal is the high level.

9. The method of claim 7, wherein
in the first negative-polarity period and the second negative-polarity period, an electrode is positive and a base material is negative, and
in the first positive-polarity period and the second positive-polarity period, the electrode is negative and the base material is positive.

10. The method of claim 8, wherein
in the first negative-polarity period and the second negative-polarity period, an electrode is positive and a base material is negative, and
in the first positive-polarity period and the second positive-polarity period, the electrode is negative and the base material is positive.

11. The method of claim 7, wherein
a signal level between the electrode and the base material in the first negative-polarity period is the same as a signal level between the electrode and the base material in the second negative-polarity period, and
a signal level between the electrode and the base material in the first positive-polarity period is the same as a signal level between the electrode and the base material in the second positive-polarity period.

12. A method for performing AC arc welding comprising:
welding with an arc generated by alternating a first negative-polarity period and a first positive-polarity period at a first AC frequency based on a positive control signal and a negative control signal that are separate from each other and are complementary to each other;
detecting an arc interruption continuing for a predetermined period; and
switching, immediately after the detecting, a polarity of the arc interruption to a polarity before the arc interruption and alternating a second negative-polarity period and a second positive polarity period at a second AC frequency based on the positive control signal and the negative control signal concurrent with the switching to generate an arc, wherein the predetermined period is shorter than the first negative-polarity period, and the predetermined period is shorter than the first positive-polarity period, wherein the arc is generated by alternating the second negative-polarity period and the second positive-polarity period at the second AC frequency higher than the first AC frequency, and wherein upon detection of the arc while welding is performed at the second AC frequency, the AC frequency is returned to the first AC frequency.

13. The method of claim 12, wherein the predetermined period is not more than 1 msec.

14. The method of claim 12, wherein the arc interruption occurs at a start of the first positive-polarity period.

15. The method of claim 12, wherein the arc interruption occurs at a start of the first negative-polarity period.

\* \* \* \* \*